April 5, 1955  E. R. ERVING  2,705,520
NON-SKID CHAIN
Filed Aug. 29, 1952  2 Sheets-Sheet 1
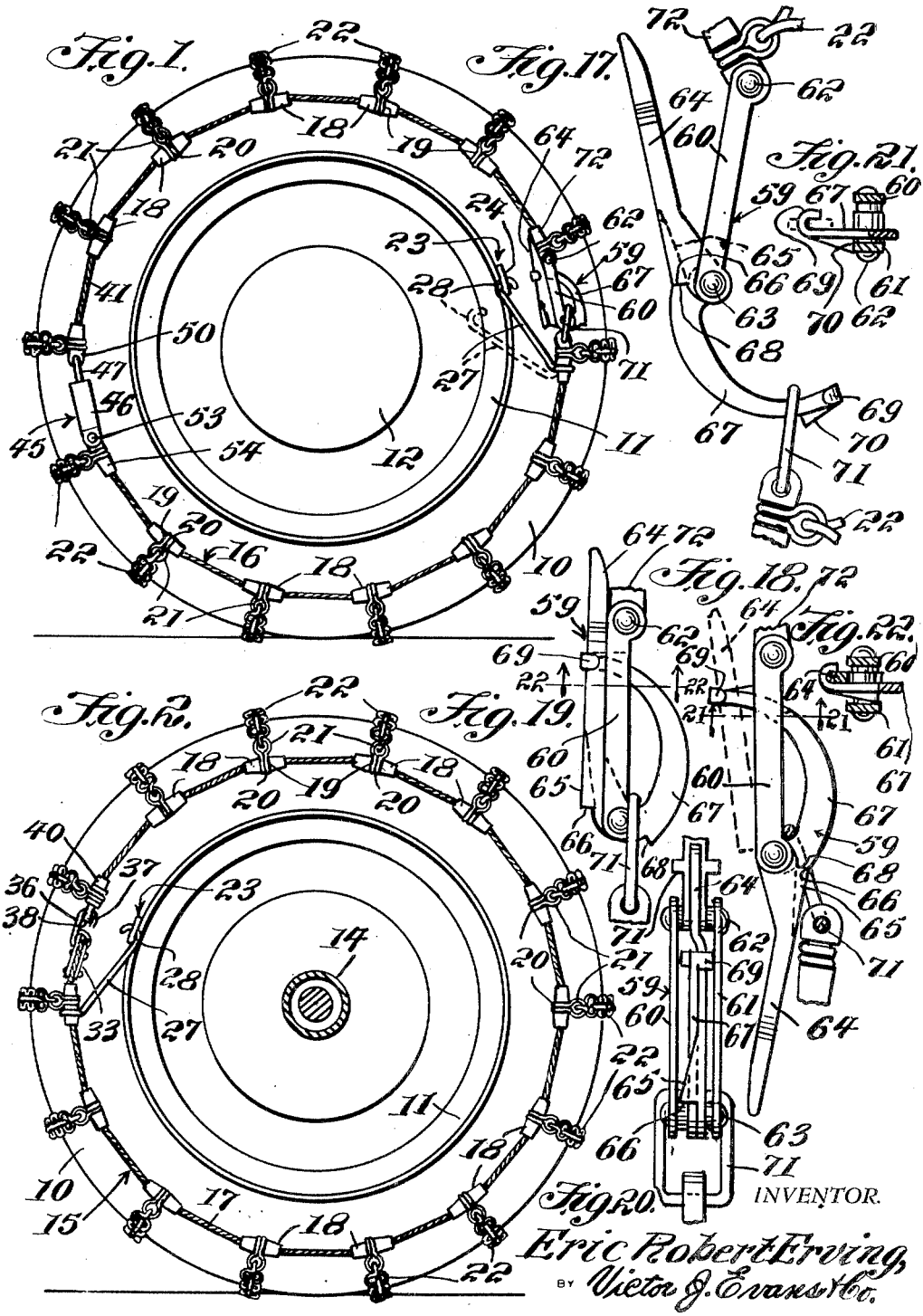
INVENTOR.
Eric Robert Erving
BY Victor J. Evans & Co.
ATTORNEYS

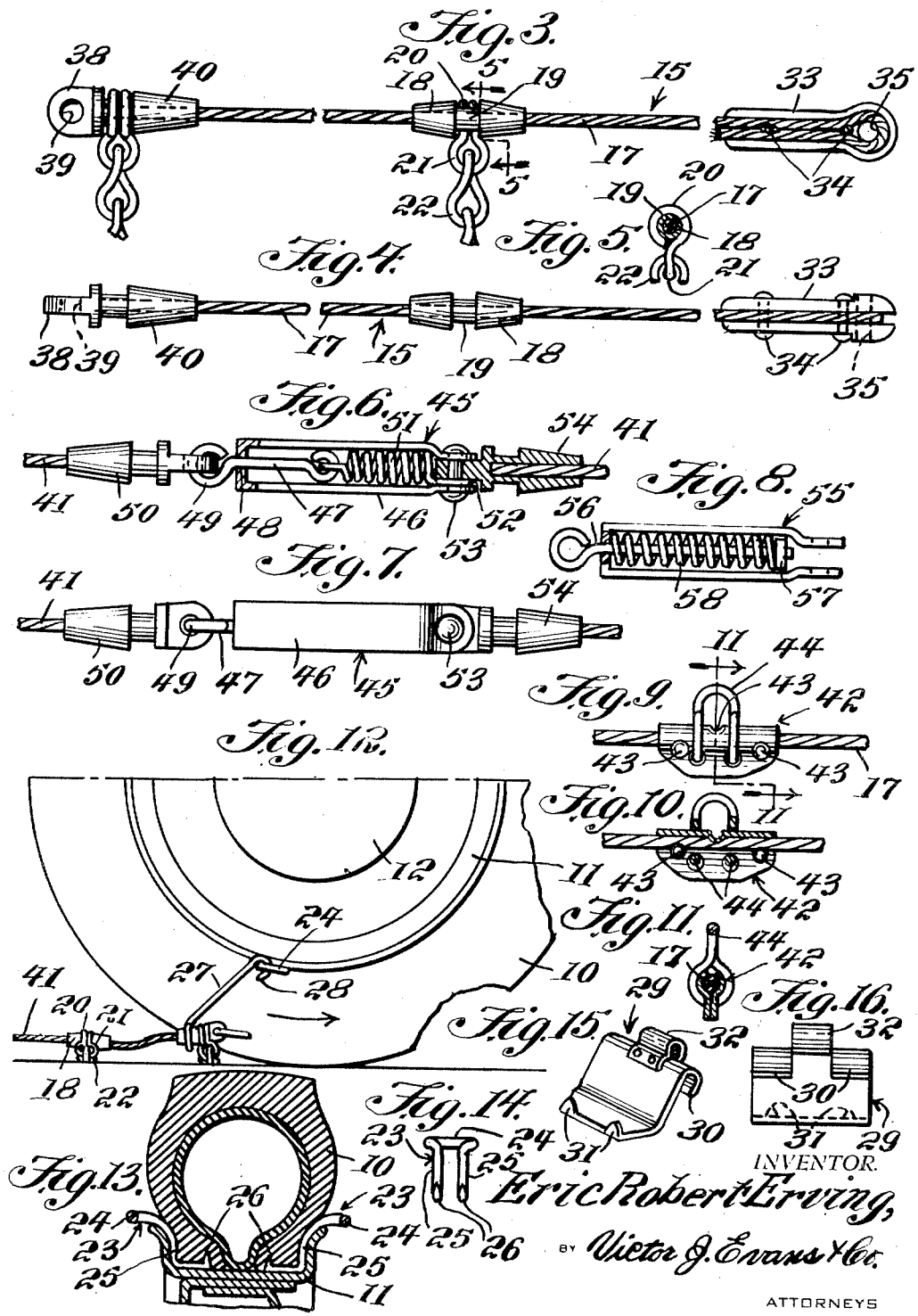

United States Patent Office 2,705,520
Patented Apr. 5, 1955

2,705,520

NON-SKID CHAIN

Eric Robert Erving, Baker, Oreg.

Application August 29, 1952, Serial No. 307,145

3 Claims. (Cl. 152—219)

This invention relates to a vehicle tire or non-skid chain.

The object of the invention is to provide a vehicle tire chain which is ruggedly constructed, light in weight and wherein a means is provided for automatically taking up slack in the chain.

Another object of the invention is to provide a tire chain which includes cables that have a plurality of connectors rigidly secured thereto, one of the connectors being adjustable to permit take-up or adjustment of the chain as wear occurs in the cross links or to enable the chain to be fitted onto different sizes of tires.

Another object of the invention is to provide a non-skid chain which includes connectors for securing the cross links and cables so that excess wear on the cables and slippage of the cross links are eliminated, there being one type of cross link connectors for light duty tires and another type for heavy duty tires.

Still another object of the invention is to provide a non-skid chain which includes a flexible tightener that exerts a tension on the crosslinks at all times so that slippage or slapping of the chains is eliminated, the flexible tightener serving to prevent the tire from being damaged by the chain and also serving to eliminate torn chains, fenders, brake lines and the like.

Still another object of the invention is to provide a tire chain which includes a locking fastening device that has a long reach and leverage whereby the bringing together of the ends of the cable is facilitated and whereby the tensioning device gives as a result of the protected spring during the application of the tire chain, the chains of the present invention being equipped or provided with applicators which permit the chain to be rolled onto the tire whereby the necessity of raising the car up with a jack, or the necessity of crawling under the car to install chains is eliminated, and this in turn insures that the drivers of the vehicles can operate the vehicles more safely since the drivers will be more likely to use these chains when they should in view of the fact that the chains are so easy to install.

A still further object of the invention is to provide a tire chain assembly which includes heavy and light duty applicators which can be used in an emergency as for example if one wheel is spinning in a mud hole or on a slick spot, the chain may be laid down on the ground in back of the wheel and the applicator applied so that as the wheel turns the applicator will pull the chain under the tire whereby the car will pull out without fastening the chain onto the wheel in the usual manner.

Still another object of the invention is to provide a non-skid chain which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a front elevational view showing the tire chain applied.

Figure 2 is a rear elevational view of the tire chain applied to a tire.

Figure 3 is an elevational view of a cable section.

Figure 4 is a top plan view of the assembly of Figure 3.

Figure 5 is a sectional view taken on the line 5—5 of Figure 3.

Figure 6 is a plan view of the flexible tightener.

Figure 7 is an elevational view of the flexible tightener.

Figure 8 is a plan view of a modified flexible tightener.

Figure 9 is an elevational view of a modified cross link connector.

Figure 10 is a longitudinal sectional view of the connector shown in Figure 9.

Figure 11 is a sectional view taken on the line 11—11 of Figure 9.

Figure 12 is a fragmentary elevational view showing the use of an applicator for applying the chain to the tire.

Figure 13 is a view similar to Figure 12, but showing a cross sectional view thereof.

Figure 14 is an elevational view of one of the applicators.

Figure 15 is a perspective view of a modified applicator.

Figure 16 is an elevational view of the applicator of Figure 15.

Figure 17 is an enlarged elevational view of the locking fastening device.

Figure 18 is a view showing an intermediate position of the locking fastening device.

Figure 19 is a view showing the locking fastening device in locked position.

Figure 20 is a view taken at right angles to the view shown in Figure 19.

Figure 21 is a sectional view taken on the line 21—21 of Figure 18.

Figure 22 is a sectional view taken on the line 22—22 of Figure 19.

Referring in detail to the drawings, the numeral 10 designates a vehicle tire such as an automobile tire, and the tire 10 is mounted on the usual rim 11. Each wheel may be provided with a hub cap 12, Figure 1, and an axle 14 extends through each wheel. The present invention is directed to a non-skid tire chain, and the tire chain of the present invention includes a pair of spaced parallel cable assemblies 15 and 16. The cable assembly 15 is arranged contiguous to the inner surface of the tire 10, while the other cable 16 is arranged adjacent to the outer surface of the tire 10.

The cable assembly 15 includes a cable 17 which may be in the form of twisted wire or steel, and mounted on the cable 17 is a plurality of sleeves 18 which provide connectors. The sleeves 18 may be die casted, crimped or otherwise bonded to the cable 17. By die casting the sleeves directly around the cable, a quick and efficient type of bonding between the sleeves and cable is provided. Each of the sleeves 18 is provided with an annular groove 19 and arranged in engagement with the groove 19 are curved fingers 20 of hook members 21. The hook members 21 are connected to each end of cross links or cross chains 22. It will be seen from the drawings that the sleeves or connectors 18 on the cable assembly 15 are arranged in registry or alinement with similar connectors 18 on the other cable assembly 16 and the cross chains 22 extend between the alined connectors.

Applicators 23 are provided for facilitating the placement of the chains on the tires, Figures 12, 13 and 14. Each of the applicators 23 may be made of heavy wire and includes a portion shaped to provide an eye 24. Extending from the eye 24 is a pair of legs 25 which terminate in hooked or pointed ends or prongs 26 which are adapted to engage the inner portions of the tire 10 to prevent accidental movement of the applicators 23. Arms 27 extend from each of the cable assemblies 15 and 16, and the arms 27 are each provided with a hook 28 for engagement with the eyes 24 on the applicators 23.

Referring to Figures 15 and 16 of the drawings, there is shown a modified applicator which is indicated by the numeral 29. The applicator 29 is adapted to be used on heavy duty trucks or tires and may be made of any suitable material such as metal. The applicator 29 is shaped to provide a lip 30 which engages the flange of the rim 11, and prongs 31 engage the tire 10 to prevent accidental movement of the applicator. A collar 32 may be secured to each of the applicators 29 for retaining therein the hooked end 28 of the arm 27.

Mounted on one end of the cable 17 is a bracket 33, and the bracket 33 may be secured to the cable 17 by suitable securing elements such as rivets 34. The free end of the bracket 33 is shaped to provide an opening 35, and one end of a hook member 36 is arranged in engagement with the opening 35. The hook member 36 which is arranged in engagement with the opening 35 is provided with a curved end 37 which is adapted to engage an opening 39 in an ear 38 which extends from the connector 40 mounted on the end of the cable 17.

The other cable assembly 16 includes a cable 41 which is arranged contiguous to the outer surface of the tire 10. Mounted on the cable 41 and secured thereto in any suitable manner are the previously described connectors or sleeves 18, and the cross chains 22 extend between the connectors 18 on the cable 41 and the connectors 18 on the other cable 17.

Referring to Figures 9, 10 and 11 of the drawings there is shown a modified connector which is indicated by the numeral 42. The connectors 42 may be used in lieu of the connectors 18, and the connectors 42 may be secured on to the cables by suitable securing elements such as rivets 43. A clamp 44 extends from each of the connectors 42 and the clamps 44 are adapted to receive the arcuate fingers 20 of the hook members that are connected to the cross chains 22.

Referring to Figures 6 and 7 of the drawings there is shown a tensioning device which is indicated by the numeral 45, and the tensioning device 45 serves to automatically take up slack in the chain. The tensioning device 45 includes a casing 46, the casing 46 being provided with an opening 48 in one end thereof. A rod 47 slidably extends through the opening 48, and one end of the rod 47 is shaped to provide a hooked end 49 for engagement with a bushing 50 that is mounted on a portion of the cable 41. Connected to the inner end of the rod 47 is a spring 51, and the spring 51 has a portion 52 mounted on a pin 53. A bushing or connector 54 is also connected to the pin 53, and the connector 54 is mounted on a section of the cable 41.

Referring to Figure 8 there is shown a modified tensioning device which is indicated by the numeral 55. The modified tensioning device 55 includes a rod 56 which has a collar 57 mounted on its inner end, and the collar 57 abuts a spring member 58. Thus, in the form of the tensioning device shown in Figure 8 when the rod 56 is pulled outwardly the spring 58 is compressed, while in the form of the invention shown in Figure 6 when the rod 47 is pulled outwardly the spring 41 is extended.

The tire chain of the present invention further includes a locking fastening device which is indicated generally by the numeral 59, and the locking fastening device 59 is shown in detail in Figures 17 through 22 of the drawings. The locking fastening device 59 includes a pair of spaced parallel links 60 and 61 which have a pin 62 extending through adjacent ends, and a pin 63 extends through the other ends of the links 60 and 61. A handle 64 is pivotally mounted on the pin 63, and a lug 65 is formed integral with or secured to the handle 64, there being a shoulder 66 on the lug 65 for a purpose to be later described. A keeper 67 is pivotally mounted on the pin 63, and the keeper 67 is provided with a shoulder 68 which is adapted to cooperate with the shoulder 66 when the keeper 67 is to be actuated or moved. One end of the keeper 67 is shaped to provide a hook 69 for selectively receiving therein the handle 64 so as to maintain the handle 64 immobile when the device is in its locked position. The keeper 67 is further provided with a shoulder 70. A ring 71 extends from a connector mounted on an end of the cable 41, and the ring 71 is arranged in engagement with the keeper 67. The pin 62 serves to pivotally connect the links 60 and 61 to a connector 72 which is also rigidly mounted on the cable 41.

From the foregoing, it is apparent that an automobile tire chain has been provided which is ruggedly constructed, light in weight, and wherein any slack will be automatically taken up. The connectors 18 may be crimped, die casted or otherwise bonded to the cables and the connectors are provided with means by which the cross chains are attached thereto. The tensioning device 45, shown in Figures 6 and 7, or the tensioning device 55 of Figure 8, serve to automatically take up slack or adjust the chain as wear occurs in the cross links 22 and also permit the chain to be fitted to different sizes of tires. The connector 18 can be used for light duty, while the connector 42 can be used for heavy duty tires. The flexible tightener 45 or the tightener 55 exerts a tension on the cross links 22 at all times whereby slippage or slapping of the chains is eliminated, and this flexible tension will prevent the tire from becoming damaged by the chain and will also eliminate torn chains, fenders, brake lines and the like. The locking fastening device 59 has a long handle 64 which provides sufficient leverage as the tension increases when the ends of the cable are brought together, and the bringing of the ends together is further facilitated by the "give" afforded by the protected spring 51 in the tightening device 45. The applicators 23 or 29 permit the chain to be rolled on to the tire to thereby eliminate the necessity of raising the car up with a jack and these applicators further eliminate the necessity of crawling under the car to install the chains. These applicators can also be used in an emergency. For example, if one wheel is spinning in a mud hole or on a slick spot, it is only necessary to lay the chain on the ground in back of the wheel and apply the applicator. Then, as the wheel turns the applicator will pull the chain under the tire and the car will pull out without fastening the chain on the wheel in the usual manner. In Figure 12, there is shown a view in which the chain is being installed on the tire 10 by using the applicator 23. Thus, to apply the chain the hooked end 28 of the arm 27 is inserted into the eye 24 of the applicator 23. This operation is first effected for the inside cable assembly 15 and then repeated for the outside cable assembly 16. Then, as the wheel of the vehicle is rolled forward a full revolution, the chain will be completely wrapped around the tire to bring both ends of the chain together to thereby facilitate the locking of the chain.

Next, the hooked end 37 of the hook member 36 is arranged in engagement with the opening 39 in the lug 38. Then, the cam or keeper 67 is arranged so that its free end projects through the link or ring 71 on the opposite end of the outside cable 41. Next, the pivoted lever handle 64 is swung until its shoulder 66 engages the shoulder 68 on the keeper 67 and continued pivotal movement of the handle 64 causes the keeper 67 to move from the position shown in Figure 17 to the locked position shown in Figure 19. This is easily accomplished by the "give" afforded by the protected spring 51 or the spring 58 in the tensioning or tightening device. The principal resistance to closing action of the locking device 59 is that of the friction between the link 71 and the inner surface of the keeper 67 because as the opposite ends of the cable 41 are being brought together, the link 71 slides toward the inner or the pivoted end of the keeper or cam 67 to thereby multiply the leverage of the lever handle 64 up to as much as five to one as the tension increases. When the keeper 67 reaches its locking position, the stop 70 on the keeper 67 engages with the linkage 61 on the fastener 59 to thereby hold the keeper 67 in place while the pivoted lever handle 64 is swung backwards into locking position to engage with the hook 69, the hook 69 being arranged on the pointed end of the keeper or cam 67. Then, the stop 70 on the keeper 67 can be released so that tension will be applied to the keeper 67 and this will close and completely lock the fastener to hold the entire chain securely on to the tire.

The connectors 18 are of the light duty type, and the bracket or connector 33 is adjustable. The connector 42, shown in Figures 9, 10 and 11 is a heavy duty connector for cross chains and is preferably made of heavy sheet metal which may be folded around the cable and spot-welded as well as crimped in the center to form an offset in the cable which prevents the connector from slipping on the cable. The legs of the clamp 44 extend through suitable openings in the connector 42 to make the connector more durable and effective. The casing 46 serves to protect the spring 51 from being stretched too far and also acts as a stop for the connecting rod 47. This casing is self cleaning because the spring 51 and connecting rod 47 are always moving to thereby eject any snow or mud therefrom. As shown in Figure 8 the spring 58 may be of the compression type instead of the expansion type shown in Figures 6 and 7. The tensioning device shown in Figure 8 is preferably used as a heavy duty tightener and the protective casing may be of either the open or closed type.

In Figure 19 the locking device is shown in fully locked position, while in Figure 18 the device is shown in partly locked position. The applicators 23 or 29 are inserted between the rim of the wheel and the bead of the tire while the tire is deflated and after the applicators have been inserted in place the tire is inflated to keep the applicators in place. These applicators are preferably installed on both rear wheels to be ready for use whenever need arises. The applicator or receiver 29 is a heavy duty device which fits snugly between the rim and bead and the points 31 grip the bead of the tire, the outer portions 30 being curved to fit around the edge of the rim and thereby form a double anchor to maintain the members more securely in place. The device 23 shown in Figures 13 and 14 is preferably used for light duty purposes. In the present invention the fastening device 59 is located on one side of the center of the wheel and the flexible tightener 45 is arranged directly opposite which tends to give a perfect balance to the wheel. In the flexible tightener the inner hook acts on the connecting rod as a stop against the inner side of the casing so that the parts cannot come loose even though the spring breaks whereby the chain will be retained on the tire. Also, the casing is open on two sides and is always contracting and expanding from the pull on the cross links whereby the tightener is self-cleaning and is inexpensive to manufacture. Furthermore, the locking device 59 is simple, compact, and fool proof and the separate pivoted lever handle 64 will exert up to a five to one or more leverage and with the keeper or cam 67 in locked position, the lever handle 64 provides an absolute locking device.

I claim:

1. In combination, a tire chain comprising a first and second cable arranged in spaced parallel relation with respect to each other, a plurality of spaced sleeves secured on said first and second cables to provide connectors, each of said sleeves being provided with an annular groove, a hook member having a pair of curved fingers arranged in engagement with said groove and provided with an eye, cross chains extending between the eyes on said hook members and secured thereto, hook means for connecting together the ends of said second cable, a pair of receivers adapted to be interposed between the vehicle tire and rim, arms extending from said cables for engagement with said receivers, each of said receivers including a wire member provided with an eye for receiving the hooked end of said arms, prongs on said receivers for engagement with said tire, a tensioning device operatively connected to said first cable and including a casing, a rod slidably mounted in said casing, and a spring positioned in said casing and connected to said rod, and a locking fastening device connected to said first cable.

2. In combination, a tire chain comprising a first and second cable arranged in spaced parallel relation with respect to each other, a plurality of spaced sleeves secured on said first and second cables to provide connectors, each of said sleeves being provided with an annular groove, a hook member having a pair of curved fingers arranged in engagement with said groove and provided with an eye, cross chains extending between the eyes on said hook members and secured thereto, hook means for connecting together the ends of said second cable, a pair of receivers adapted to be interposed between the vehicle tire and rim, arms extending from said cables for engagement with said receivers, each of said receivers including a wire member provided with an eye for receiving the hooked end of said arms, prongs on said receivers for engagement with said tire, a tensioning device operatively connected to said first cable and including a casing, a rod slidably mounted in said casing, and a spring positioned in said casing and connected to said rod, and a locking fastening device connected to said first cable, said locking fastening device comprising a pair of links having one end connected to one end of said first cable, a pin extending between the other ends of said links, a keeper pivotally mounted on said pin and provided with a hook thereon, a handle pivotally mounted on said pin and adapted to be engaged by the hook on said keeper, and coacting shoulders on said handle and keeper.

3. In combination, a vehicle tire, and a chain including a first and second cable, said cables being arranged in spaced parallel relation with respect to each other, a plurality of sleeves mounted on said first cable, each of said sleeves being provided with an annular groove, a hook member arranged in engagement with said groove, cross links connected to said hook members, connectors mounted on said second cable and connected to said cross links, applicators for placing the chain on the tire including an eye, a pair of legs extending from said eye and terminating in prongs adapted to engage the inner portions of the tire, arms extending from said cables and each provided with a hook for engagement with the eyes on the applicator, a bracket mounted on one end of said first cable and secured thereto, the free end of said bracket being shaped to provide an opening, a hook member having one end arranged in engagement with said opening, said hook member being provided with a curved end, a connector on said first cable having an ear extending therefrom provided with an opening for receiving said curved end, a tensioning device including a casing provided with an opening in one end thereof, a rod slidably extending through the opening in said casing and provided with a hooked end, a first bushing mounted on said second cable and engaged by said hooked end, a spring connected to the inner end of said rod, a pin arranged in engagement with a portion of said spring, a second bushing mounted on said second cable and connected to said pin, a locking fastening device including a pair of spaced parallel links, a first and second pin extending through the ends of said links, a handle pivotally mounted on said first pin, a lug extending from said handle and provided with a shoulder, a keeper pivotally mounted on said first pin and provided with a shoulder for engaging the shoulder on said lug, one end of said keeper being provided with a hook for selectively receiving therein said handle, and a ring arranged in engagement with said keeper and connected to said second cable.

References Cited in the file of this patent

UNITED STATES PATENTS

| | | |
|---|---|---|
| 909,037 | Taylor et al. | Jan. 5, 1909 |
| 969,426 | Traver | Sept. 6, 1910 |
| 1,238,553 | Morse | Aug. 28, 1917 |
| 1,460,803 | Portzer | July 3, 1923 |
| 1,534,976 | Longman | Apr. 21, 1925 |
| 1,560,525 | Barrell | Nov. 10, 1925 |
| 1,583,330 | Yount | May 4, 1926 |
| 1,605,407 | Hughes | Nov. 2, 1926 |
| 1,619,846 | Arnzen | Mar. 8, 1927 |
| 1,864,869 | Squier | June 28, 1932 |
| 2,153,003 | Meyers et al. | Apr. 4, 1939 |
| 2,545,061 | Weber | Mar. 13, 1951 |
| 2,609,027 | Locke | Sept. 2, 1952 |
| 2,663,061 | Zarth | Dec. 22, 1953 |